United States Patent [19]

Mobley

[11] Patent Number: 4,805,229
[45] Date of Patent: Feb. 14, 1989

[54] DIVERSITY COMBINER

[75] Inventor: J. Graham Mobley, Dunwoody, Ga.

[73] Assignee: Scientific-Atlanta, Inc., Atlanta, Ga.

[21] Appl. No.: 1,886

[22] Filed: Jan. 9, 1987

[51] Int. Cl.[4] ............................................ H04B 17/02
[52] U.S. Cl. ................................... 455/138; 455/137; 455/276
[58] Field of Search ............... 455/276, 278, 284, 138, 455/137, 139, 234, 246, 296, 289; 375/102, 100; 343/814, 893

[56] References Cited

U.S. PATENT DOCUMENTS

| 2,955,199 | 10/1960 | Mindes | 250/20 |
|---|---|---|---|
| 2,975,275 | 3/1961 | Adams | 250/20 |
| 3,048,782 | 8/1962 | Altman | 325/305 |
| 3,195,049 | 7/1965 | Altman et al. | 325/305 |
| 3,201,692 | 8/1965 | Sichak et al. | 325/17 |
| 3,348,152 | 10/1967 | Laughlin, Jr. et al. | 325/305 |
| 3,631,344 | 12/1971 | Greenwald | 325/305 |
| 3,641,437 | 2/1972 | Gurak et al. | 455/138 |
| 3,835,392 | 9/1974 | Mahner et al. | 455/138 |
| 3,934,204 | 1/1976 | Hill | 455/138 |
| 3,952,304 | 4/1976 | Broniwitz et al. | 343/16 M |
| 3,965,422 | 6/1976 | Tagliaferri | 455/138 |
| 4,670,885 | 6/1987 | Parl et al. | 455/284 |

FOREIGN PATENT DOCUMENTS

| 50515 | 5/1977 | Japan . |
|---|---|---|
| 103624 | 8/1979 | Japan . |
| 403085 | 10/1974 | U.S.S.R. . |
| 437235 | 12/1974 | U.S.S.R. . |
| 2063623 | 6/1981 | United Kingdom . |

OTHER PUBLICATIONS

1978 Conference on Communications Equipment, 4/78, De Susans, Fig. 2.

Primary Examiner—Robert L. Griffin
Assistant Examiner—Curtis Kuntz
Attorney, Agent, or Firm—Kilpatrick & Cody

[57] ABSTRACT

Diversity combiners for use in satellite and other communication systems. Such combiners are able to accommodate fast and dramatic signal fades and doppler shifts inherent in satellite communications by employing differential and common mode automatic phase control and differential and common mode signal weighting techniques. Phase control takes place in these combiners after signal weighting to decrease differential loop phase detector gradients and noise bandwidth as a function of signal-to-noise imbalance of the channels. An acquisition circuit is provided to deactivate the differential phase control loop when either signal falls below a predetermined level. During times when the faded signal reemerges, the combiner establishes optimal combining with minimum phase discontinuities on the output or phase lock reacquisition disturbances.

14 Claims, 3 Drawing Sheets

DIVERSITY COMBINER

This invention relates to methods and devices for combining signals from two or more communications receivers.

BACKGROUND OF THE INVENTION

Diversity techniques have been used for many years to address signal fading and other phenomena that take place in radio communications systems. In general, two or more signals from a source may be received, processed in two or more channels and combined in an appropriate manner in order to reduce effects of fading and other phenomena.

Diversity techniques include at least four types: space, frequency, time and angle diversity. A space diversity system includes two or more antennas spaced far enough apart to yield signals which have different fading characteristics. In the other systems, carrier frequencies are spaced apart, time delays are incorporated or separately polarized beams are used toward the same end. Although the present invention is discussed primarily with respect to space diversity systems, it may be used with any appropriate diversity techniques or systems.

Space diversity systems have long been used in over-the-horizon or forward scattering ultra-high frequency systems. Many of those systems combine two signals which share a common frequency by adjusting the phase of each signal to be combined with respect to the other. The aim is to ensure that the signals are substantially time coincident and in a predetermined phase relationship and to obtain maximum additive effect when the signals are combined. Such a system is disclosed in U.S. Pat. No. 2,975,275 issued Mar. 14, 1961 to Adams. That patent is incorporated by reference.

Such phase control "techniques" include adjusting the frequency of an oscillator in each signal channel with respect to a control signal corresponding to the phase difference between the channels in order to cause frequency, phase and time coincidence of the intermediate frequency signals to be combined. One such technique involves the use of a phase detector to compare the phase of the IF signal in each channel. The phase detector is coupled to an oscillator which drives the two IF signals into desired phase relationship for additive combining. This technique is disclosed in U.S Pat. No. 2,955,199 issued Oct. 4, 1960 to Mindes, which is incorporated by reference.

Other diversity techniques involve adjusting not only the phase of the signal in each channel with respect to the other channel, but also adjusting both signals with respect to a reference frequency. The first type of control is referred to in this document as "differential mode" phase control while the second is referred to as "common mode" phase control.

Types of differential and common mode phase control are disclosed in U.S. Pat. No. 3,201,692 issued Aug. 17, 1965 to Sichak, et al., which is incorporated by reference. The Sichak patent discusses the use of such techniques in a single sideband communications systems. It discloses a system in which a phase detector monitors the combined signal and controls oscillators in one or more signal channels. Similar common mode phase control techniques are also disclosed in U.S. Pat. No. 3,348,152 issued Oct. 17, 1967 to Laughlin, Jr. et al., which is incorporated by reference.

Space diversity techniques have proven useful in satellite communications. Satellite spin creates periodic signal dropouts at essentially one dropout per revolution of the satellite about its axis. Satellite communications also involve doppler shifts which are not encountered in earth antenna communications systems. Doppler shifts result not only from the orbital motion of the satellite with respect to the earth's surface, but also from the satellite mounted antenna spinning about the axis of the satellite and thus moving with respect to the receiving antennas on the earth. Satellite spin dropouts and shifts occur quickly and dramatically, so a satellite communication diversity system must be able to handle fast fades and rapid doppler shifts.

Signals received from the satellite in a space diversity system have essentially identical modulation formats so that their spectral contents differ only in phase and frequency. The signals presented to a combiner in such a system may exhibit differences not only in strength and doppler, but also in down converter frequency offsets, delays due to differing cable lengths and other differences such as from oscillator characteristics. Diversity techniques in satellite communications must address not only these concerns, but they also should provide tracking for common mode doppler effects and centering the combined signal in the desired passbands of each receiver.

Equally important in diversity techniques is the need to weight the signals to be combined in an optimal fashion. The signals may be weighted according to the output gain of the combiner in order to compensate for fading and to normalize the output to required levels. This first type of weighting, referred to sometimes in this document as "common mode" weighting, includes a technique known as "equal gain" combining. Equal gain combining is described in U.S. Pat. No. 3,631,344 issued Dec. 28, 1971 to Greenwald, which is incorporated by reference. It discloses a system in which the output of the combiner, the common IF signal, is monitored to generate an automatic gain control signal. This AGC signal is applied to the IF amplifier in each channel in an effort to assure a constant amplitude, common IF signal at the output of the combiner.

Because equal gain combining causes the weaker signal to contribute undesired noise to the common signal, however, techniques have been developed to weight each signal to be combined with respect to the gain of the other signal. Such techniques are referred to in this document as "differential mode" weighting techniques. One differential mode technique has been referred to as "maximal ratio" combining. There, the gain for each IF signal prior to combining is adjusted according to the ratio of the signal levels of the channels. Maximal ratio combining is disclosed in U.S. Pat. No. 3,195,049 issued July 13, 1965 to Altman et al., which is incorporated by reference.

SUMMARY OF THE INVENTION

Diversity combiners according to the present invention utilize both diversity and common mode techniques not only for maximizing phase coherency between two or more channels, but also for weighting the signals to be combined.

A phase detector monitors the phase difference between the channels in a two channel system according to the present invention and applies equal magnitude but opposite polarity control signals to voltage controlled crystal oscillators for each channel. These oscillators provide second local oscillation for the two channels. The phases of the two signals are thus driven toward one another in a differential feedback loop.

Common mode phase control is provided by frequency/phase detection in the receiver demodulator used for signal detection. A carrier recovery circuit derives a carrier component from the incoming combined signal. The carrier is compared against a reference frequency to provide a phase error signal to both voltage controlled crystal oscillators used in the differential loop. This signal steers the oscillators to maintain phase coherency and phase lock to the reference frequency. This common loop has bandwidth adequate to track orbital doppler and oscillator phase noise but small enough to minimize the degradation of demodulator performance caused by thermal noise. A significant advantage of this configuration is that common mode automatic phase control utilizes the combined signal and therefore has improved noise performance.

Because the combiner must be able to handle fast and dramatic signal fades and fast doppler shifts inherent in satellite communications, the combiner includes an acquisition circuit which deactivates the differential mode phase loop when the signal in either of the channels falls below a predetermined level. The acquisition circuit compares phases between the two channels to accomplish this and therefore allows the differential loop to reactivate with minimum discontinuity when the faded signal increases in strength.

Perhaps equally important are automatic gain control techniques of the present invention. Each channel provides a measure of average signal-to-noise ratio from the receiver AGC bus "zeroed on noise." Because the AGC bus responds too slowly to track fast signal fades of amplitude modulation, however, AM detectors are used in the diversity combiner to monitor fast signal level changes. The output of the AM detectors is applied to log amplifiers and summed with the AGC signals from the receivers. A differential amplifier utilizes these signals to generate signals that correspond to the ratio of signal-to-noise ratios of the two channels. These signals are applied to weighting amplifiers in each channel which have gain control inputs that are linearized so that weighting gain in decibels is proportional to input voltage. Control voltages from the differential amplifier thus increase the gain of the stronger signal and decrease the gain of the weaker signal.

Common mode signal weighting is also utilized in the present invention, among other purposes, to normalize the combiner output. An AGC detector monitors the combiner output level and provides control to each weighting amplifier to establish common mode operating gain.

The weighting amplifiers of the present invention provide optimally weighted signals to the phase control loops, rather than the signals being weighted after phase control takes place. As a result, the differential loop phase detector gradient and noise bandwidth as a function of signal-to-noise imbalance of the channels is minimized.

It is therefore an object of the present invention to provide a diversity combiner that is able to accommodate fast doppler shifts and signal fades inherent in satellite communications by employing differential and common mode automatic phase control and signal weighting techniques.

It is an additional object of the present invention to provide a diversity combiner in which signal weighting takes place prior to phase control in order to decrease differential loop phase detector gradients and noise band-width as a function of signal-to-noise imbalance of the channels.

It is an additional object of the present invention to provide a diversity combiner that is able to track common mode orbital induced doppler and center the passband of each channel with improved noise performance.

It is an additional object of the present invention to optimize diversity combiner performance by weighting each signal to be combined according to its instantaneous signal-to-noise ratio and according to an automatic gain control signal from its channel.

It is a further object of the present invention to provide differential mode phase coherency control techniques which utilize means for detecting and compensating for dramatic and fast changes in signal level and doppler shifts.

It is a further object of the present invention to provide phase coherency control techniques that utilize differential and common mode phase control to eliminate the master-slave techniques commonly used in diversity combiners.

It is a further object of the present invention to provide phase coherency control techniques that utilize differential and common mode phase control in which an acquisition circuit deactivates or attenuates the differential loop when either input signal falls below a predetermined level and then subsequently requires and reactivates the differential loop when the signal levels are regained.

Other objects, features and advantages of the present invention will become apparent with reference to the remainder of the text and the drawings.

DETAILED DESCRIPTION OF THE DRAWINGS

Figure 1:
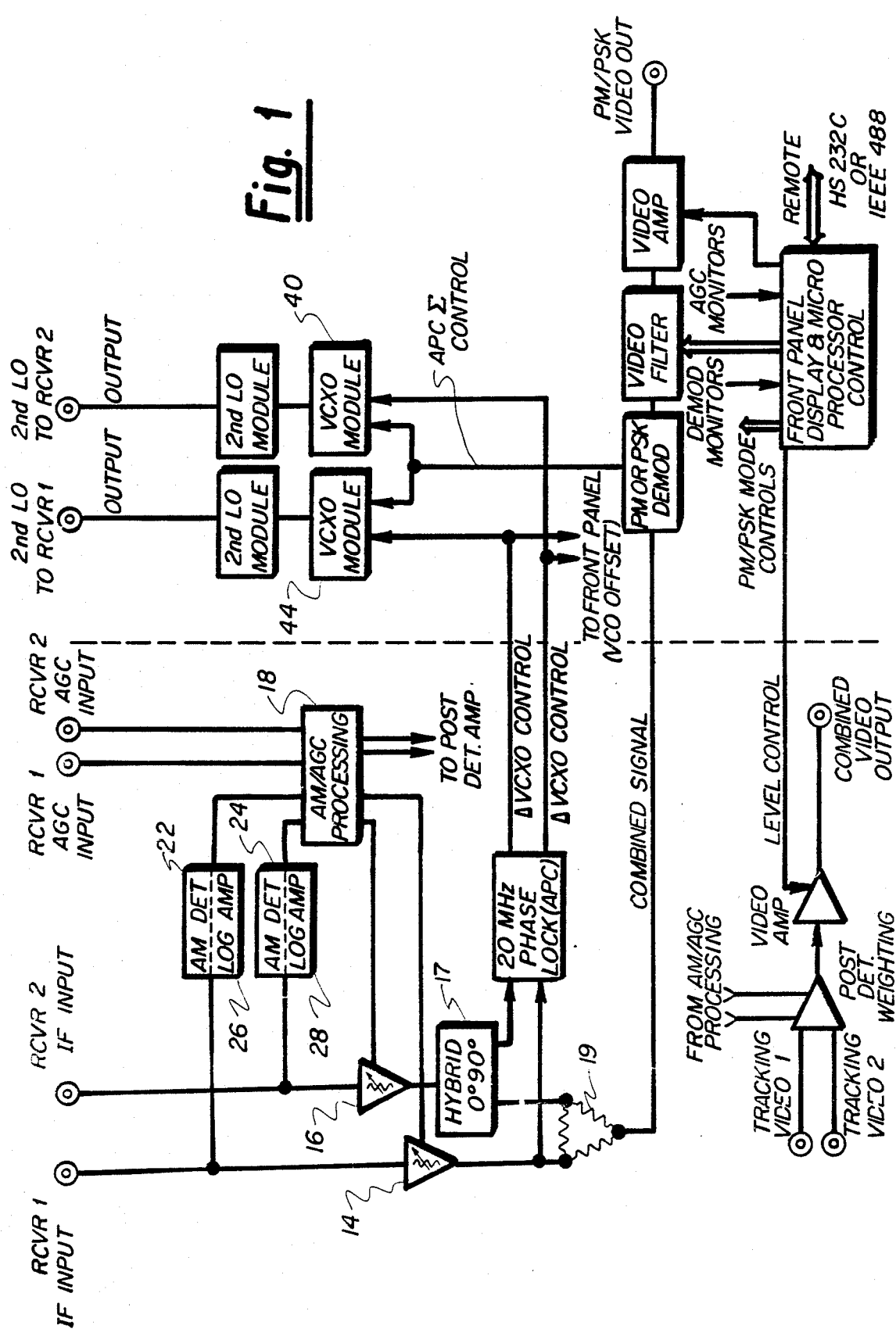
FIG. 1 is a diagram of elements of a diversity combiner according to a preferred embodiment of the present invention.

FIG. 1 illustrates in block form a preferred embodiment of a diversity combiner according to the present invention. Signals from each channel are applied to weighting amplifiers 14 and 16. Amplifiers 14 and 16 may be any conventional amplifiers which control the gain of the received IF signals. They preferably control that gain according to gain control inputs that are linearized so that weighting gain in decibels is proportional to input control voltage. Amplifiers 14 and 16 are coupled to a summer 19 which sums the weighted signals to produce the combined output of the diversity combiner.

Figure 2:
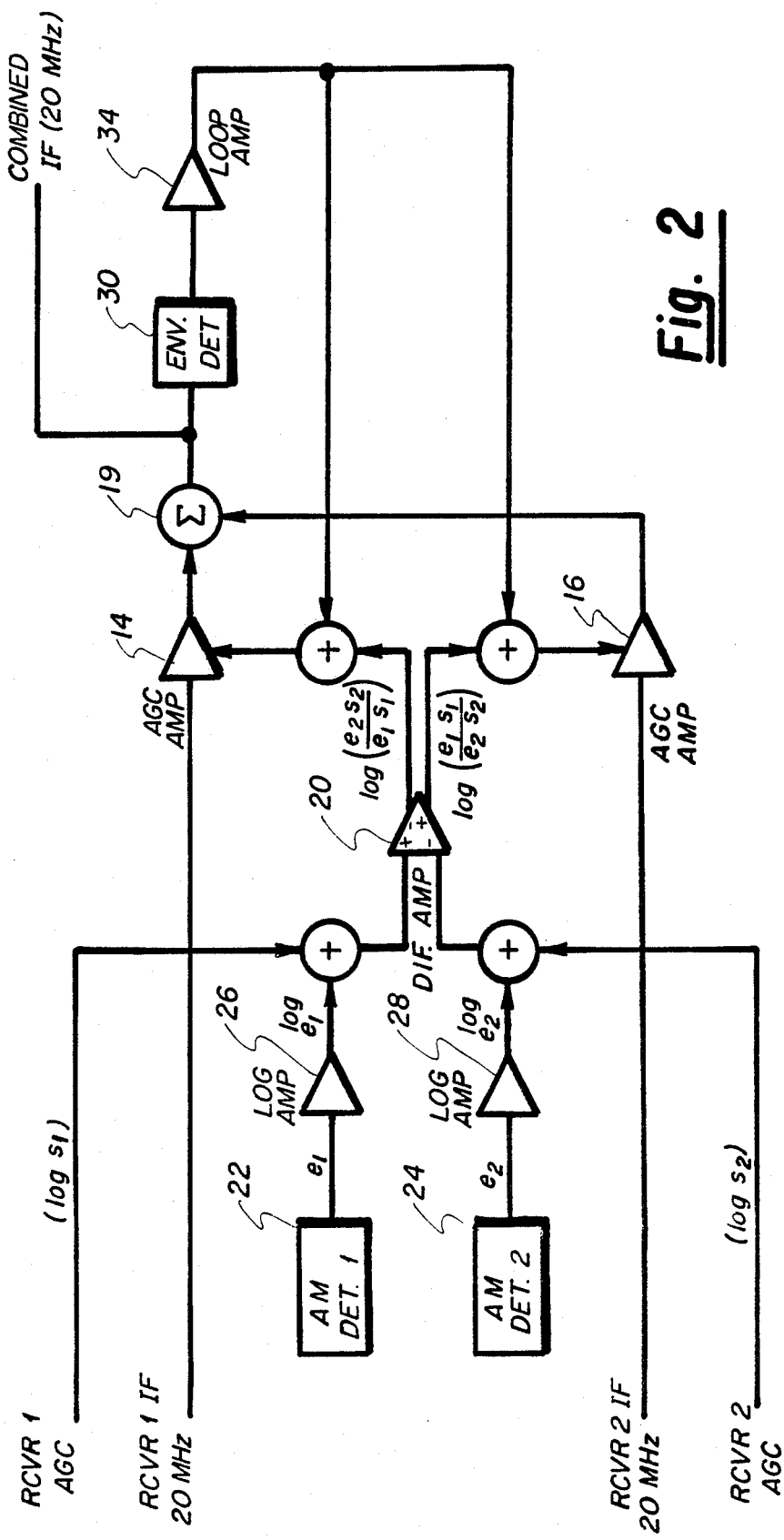
FIG. 2 is a diagram of the signal weighting circuits used in combiner of FIG. 1.

Signal weighting elements in FIG. 1 are shown in greater detail in FIG. 2. The gain of each weighting amplifier 14 and 16 is controlled by differential and common mode weighting loops. The differential loop as shown in FIG. 2 utilizes automatic gain control signals "zeroed on noise" from each receiver to control a differential amplifier 20 which may be of conventional design. AM detectors 22 and 24 coupled to logarithmic amplifiers 26 and 28 monitor fast level changes in the receiver IF signals not monitored by the receiver's AGC bus. The signals from the logarithmic amplifiers 26 and 28 are summed with the AGC signals from the receivers for input to the differential amplifier 20. Differential amplifier 20 generates for each channel an output signal proportional to the logarithm of the signal-to-noise ratio of that channel relative to the signal-to-noise ratio of the other channel. These output signals are applied to the weighting amplifiers 14 and 16 for each channel.

The output of the combiner must be normalized to a desired reference level. A common mode loop which includes an AGC detector 30 monitors the combined IF signal from summer 19 coupled to weighting amplifiers 14 and 16 to provide control signals through AGC loop amplifier 34 to the control input to each weighting amplifier 14 and 16.

Figure 3:
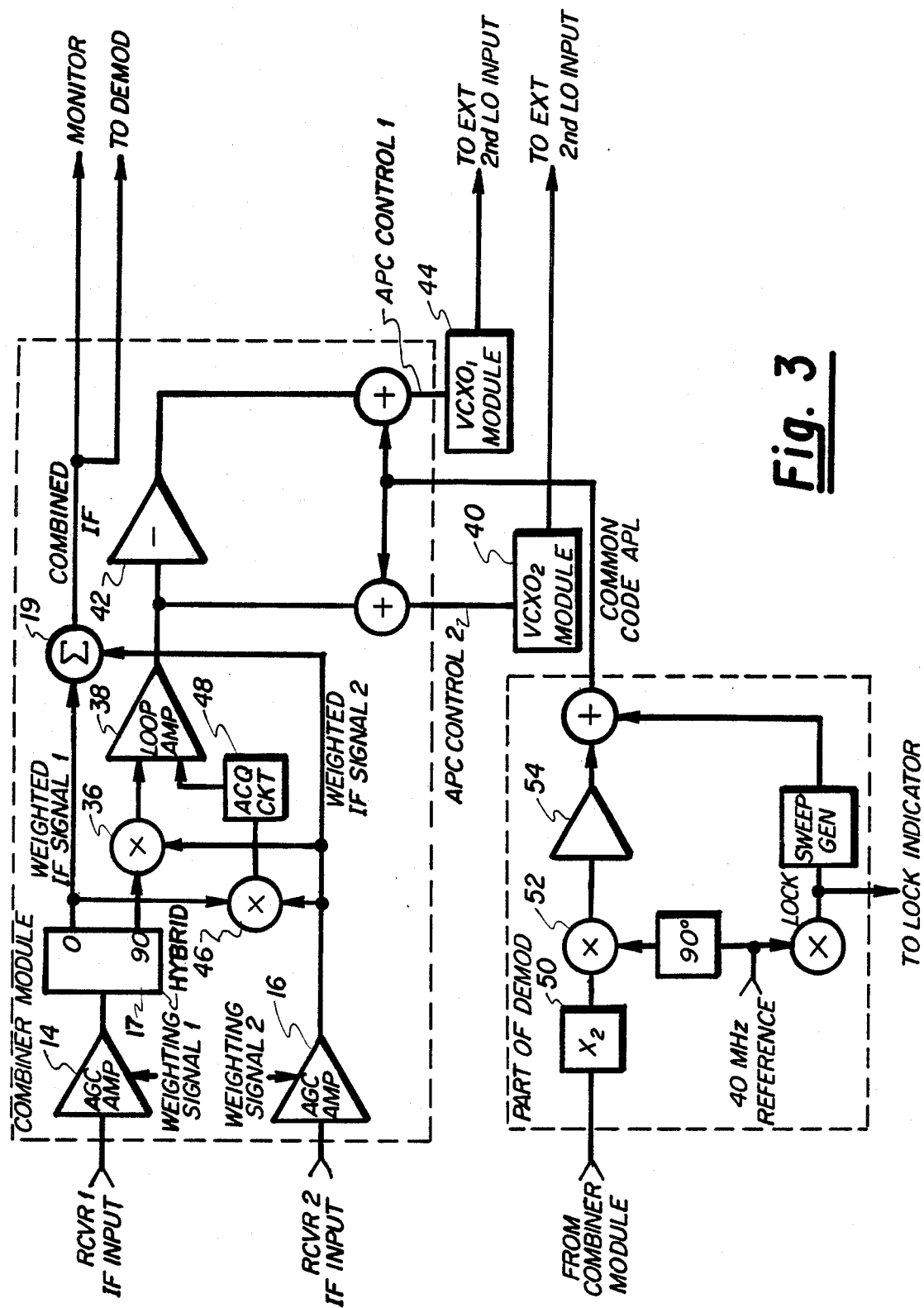
FIG. 3 is a diagram of the phase control circuits used in the combiner of FIG. 1.

The received IF signals are thus weighted before phase control is applied. FIGS. 1 and 3 illustrate differential and common mode phase control according to the present invention. AGC amplifiers 14 and 16 are coupled to a phase detector 36 as shown in FIG. 3. Hybrid 17 provides a 90 degree phase shift between amplifier 14 and detector 36. Detector 36 is coupled to a loop amplifier 38 whose output is connected to a voltage controlled crystal oscillator 40 for the second channel. The output polarity of loop amplifier 38 is inverted in inverter 42 and applied to a VCXO 44 for channel 1. The VCXO's provide second local oscillator signals for down converting the received signals to a 20 mHz IF frequency. As perhaps best shown in FIG. 1, the circuit describes a differential feedback loop for automatic phase control and serves to maintain phase coherency between the received signals. The gain versus frequency characteristics of this loop may be made selectable and can be tied to the bandwidth selected in the demodulator. The loop may also contain an integrator to hold static phase error near zero.

A second detector 46 is used as a coherent detector with output proportional to the product of the two input signals from weighting amplifiers 14 and 16. Output from detector 46 is used by acquisition circuit 48. When the differential loop is locked, the output from phase detector 36 is zero volts while the output from coherent detector 46 is at a maximum positive value. These conditions are present because of the 90° phase difference between the two outputs of hybrid 17. Acquisition circuit 48 serves two functions. When locked acquisition circuit 48 provides a signal to loop amplifier 38 to disable the differential loop if either received signal becomes excessively noisy. This is achieved by comparing the output of coherent detector 46 against a fixed threshold level. If the detector output is below the fixed level, loop amplifier 38 is disconnected from phase detector 36 thus opening the differential loop. The second function for acquisition circuit 48 is to aid in initial acquisition or reacquisition of the differential APC loop.

During initial acquisition or reacquisition, circuit 48 works as follows When locked, phase detector 36 produces a periodic "beat note" whose periodic rate is proportional to the frequency error between the two received signals. Likewise, coherent detector 46 produces a periodic "beat note" with the same periodic rate as detector 36. However, because of the 90° phase difference developed between the two output signals from hybrid 17, the waveform generated by coherent detector 46 passes through zero volts when the waveform generated by detector 36 passes through either a maximum positive or maximum negative value. A further characteristic of the two waveforms is that the polarity of the waveform from detector 36 when observed during a positive sloped zero crossing at the output of detector 46 changes depending on the polarity of the frequency difference between the two received channels. The acquisition circuit samples the voltage from detector 36 during positive zero crossings of the waveform generated by detector 46. Thus, a signal is developed whose polarity is indicative of the polarity of the frequency error. During acquisition, this signal is supplied to loop amplifier 38 to steer the differential loop to bring the frequency error to zero and thus allow the loop to phase-lock.

The differential loop provides no control for tracking common mode doppler or centering of the signal in a second IF passbands of each receiver. This function is provided by frequency/ phase detection in the particular demodulator used for signal detection. The demodulator shown in FIG. 3 is a PSK demodulator; however, a PM demodulator or an FM demodulator may be used depending on the signal modulation format. In the demodulator shown in FIG. 3, carrier recovery circuit 50 derives a carrier component from the incoming combined IF signal from the combiner. The recovery carrier is compared against a reference signal in phase detector 52. The phase error after amplification in amplifier 54 is provided to both voltage control crystal oscillators 40 and 44 to maintain phase coherency and phase lock to the reference frequency. The common mode APC loop preferably has bandwidth adequate to track the orbital doppler and oscillator phase noise but narrow enough so that thermal noise provides minimal degradation to demodulator performance. Because this common mode APC approach uses the combined signal for automatic phase control, it provides the added advantage of improved APC noise performance.

In operation, if the signal on one channel undergoes a fast fade such as that caused by a spinning satellite antenna, the AGC signal from the receiver will not catch the fade. However, the AM detector 22 or 24 will undergo a dramatic drop in level as will the output of its associated logarithmic amplifier 26 or 28. This voltage change will upset the balance on the differential amplifier 20 such that the weighting amplifier 14 or 16 will be heavily attenuated while the other weighting amplifier will have increased gain. The AGC detector 30 at the combined output will detect an increase in output level and renormalize the two weighting amplifiers 14 and 16 to maintain a predetermined desired level. The signal fade and the resulting attenuation of the channel will cause the gradient of the differential phase detector 46 to tend to zero. The differential APC loop will deactivate and both VCXO's 40 and 44 will track the common mode APC loop. When the signal returns, the differential loop will reactivate and the reemerging signal will again be combined to form a portion of the output.

The foregoing is provided for illustration and description of a preferred embodiment of the invention. Modifications and adaptations to this embodiment will be apparent to those of ordinary skill in the art and may be made without departing from the scope or spirit of the invention.

I claim:
1. A diversity combiner, comprising:
   (a) a signal weighting section which provides differential and common mode weighting to signals from at least two channels and combines the signals to form a combined signal comprising:
  (i) differential mode signal weighting means connected to each channel for receiving intermediate frequency signals from the channels and for adjusting the gain of each channel according to a function of the gains of the other channels; and
  (ii) common mode signal weighting means connected to the differential mode signal weighting means for adjusting the gain of each channel to achieve a predetermined combiner output level; and
(b) a phase control section which receives signals for each channel which have been subjected to differential and common mode weighting in the weighting section and provides differential and common mode phase control to the signal comprising:
  (i) differential mode phase control means connected to the differential mode signal weighting means and to each channel for adjusting the phase of each channel according to a function of the phases of the other channels; and
  (ii) common mode phase control means connected to the common mode signal weighting means and to each channel for adjusting the phase of each channel according to a function of the phase of a reference signal.

2. A diversity combiner according to claim 1 in which the differential mode phase control means comprises:
  (a) AM detection means for detecting fast signal fades and doppler shifts in each channel;
  (b) differential amplifier means which receives signals from the AM detection means; and
  (c) weighting amplifier means for each channel for receiving control signals from the differential amplifier means corresponding to the ratios of signal-to-noise ratios for the channels and for adjusting the gain of that channel's signal according to the received control signal.

3. A diversity combiner according to claim 2 in which the differential amplifier means also receives AGC signals from each channel to generate control signals for the weighting amplifier means.

4. A diversity combiner according to claim 1 in which the common mode signal weighting means comprises:
  (a) weighting amplifier means for each signal channel for adjusting the gain of that channel's signal;
  (b) summing means coupled to the weighting amplifier means for summing the signals to form a combined signal; and
  (c) envelope detection means for monitoring the level of the combined signal and providing a control signal to be applied to the weighting amplifier means for each channel.

5. A diversity combiner according to claim 1 in which the differential phase control means comprises:
  (a) a phase detector means which receives signals from the signal weighting section to provide phase difference signals;
  (b) a first oscillator means for receiving phase difference signals originating in the phase detector to provide oscillation to a first channel;
  (c) inverter means for inverting the polarity of the phase difference signals; and
  (d) a second oscillator means for receiving phase difference signals from the inverter means to provide oscillation to the second channel.

6. A diversity combiner according to claim 1 in which the differential mode signal weighting means for each channel comprises an automatic gain control amplifier controlled by an input corresponding to the signal-to-noise ratio of that channel and the signal-to-noise ratios of the other channels.

7. A diversity combiner according to claim 6 in which each channel's signal-to-noise ratio is presented as an automatic gain control signal and in which the differential mode signal weighting means for each channel further comprises:
  (a) detector means for detecting quick signal level changes; and
  (b) combining means for adjusting that channel's automatic gain control signal according to the detector means output.

8. A diversity combiner according to claim 6 in which the differential mode signal weighting means further comprises at least one differential amplifier whose inputs correspond to the signal-to-noise ratio of each channel and which provides a signal to each channel's automatic gain control amplifier corresponding to the signal-to-noise ratio of that channel relative to the signal-to-noise ratios of the other channels.

9. A diversity combiner according to claim 6 in which the common mode signal weighting means comprises:
  (a) summing means coupled to the automatic gain control amplifiers for combining the signals of the channels;
  (b) an automatic gain control detector coupled to the summing means for monitoring the combined signal output level of the summing means; and
  (c) combining means for adjusting the input of each automatic gain control amplifier according to the output of the automatic gain control detector.

10. A diversity combiner according to claim 1 for providing phase coherency between two channels in which the differential mode phase control means for each channel comprises an oscillator means coupled to that channel which oscillator means is controlled by a signal corresponding to the difference in phase between that channel and the other channels.

11. A diversity combiner according to claim 10 in which the differential mode phase control means further comprises a phase detector for monitoring the difference in phases of the channels and in which the oscillator for one of the channels is controlled by a signal corresponding to the phase detector output and the oscillator for the other channel is controlled by a signal corresponding to the phase detector output inverted in polarity.

12. A diversity combiner according to claim 1 in which the differential mode phase control means includes an acquisition sensing means for deactivating the differential mode phase control means when the gain of either channel falls below a predetermined level.

13. A diversity combiner according to claim 12 in which the acquisition sensing means comprises:
  (a) detector means for detecting when the gain of either channel falls below a predetermined level; and
  (b) an acquisition circuit coupled to the detector means for controlling the differential mode phase control means.

14. A diversity combiner according to claim 10 in which the common mode phase control means comprises:

(a) demodulator means for deriving a carrier component from a combined signal, comparing that carrier component with a reference signal in order to derive a phase error signal; and (b) adding means coupled to the demodulator means for contributing the phase error signal to the input of each channel's oscillator means.

* * * * *